United States Patent Office 3,598,799
Patented Aug. 10, 1971

3,598,799
LACTONE COPOLYMERS
Floyd E. Naylor, Bartlesville, Okla., assignor to
Phillips Petroleum Company
No Drawing. Filed Dec. 10, 1969, Ser. No. 883,986
Int. Cl. C08f 19/08
U.S. Cl. 260—879
14 Claims

ABSTRACT OF THE DISCLOSURE

Copolymers containing lactones are prepared by a polymerization process that embodies the addition of an isocyanate adjuvant that increases the conversion of lactone monomer and provides a lactone copolymer possessing excellent green tensile strength.

---

This invention relates to a novel polymerization process for preparing lactone copolymers. This invention also relates to a method for increasing the conversion of lactone monomer in a polymerization process for preparing copolymers containing lactones. This invention further relates to a lactone copolymer exhibiting excellent green tensile strength when prepared according to the process of this invention.

It has been surprisingly discovered that if an isocyanate adjuvant comprising a polyisocyanate or polyisothiocyanate is employed in the polymerization process for lactone monomers that block or graft copolymers of lactones can be formed which exhibit excellent green tensile strength and further that said isocyanate adjuvant increases the conversion of said lactone monomer to said block or graft copolymers.

It is an object of this invention to provide a process for preparing lactone copolymers. It is an object of this invention to prepare lactone copolymers exhibiting enhanced green tensile strength when prepared according to the process of this invention. Other objects, aspects, and advantages of this invention will be apparent to those skilled in the art from the disclosure, claims, and discussion herein set forth.

According to this invention, a lactone copolymer, including both block and graft, is prepared in a polymerization process that embodies the addition of an isocyanate adjuvant, at particular intervals in the polymerization process wherein said isocyanate adjuvant increases the conversion of lactone monomer and consequently provides a lactone block copolymer possessing excellent green tensile strength.

In accordance with this invention essentially any base polymer is provided, or prepared by any conventional method, that has at least one

group per base polymer molecule, wherein M is an alkali metal atom and C is a carbon atom. The

group can be carried on the end of the polymer molecule, i.e. be terminal, or along the length of that molecule, i.e., intermediate, or both, or mixed, if more than one such group is present on a single polymer molecule.

It is to be understood that a preformed base polymer can be provided and then converted to the final lactone copolymer by the process of this invention or alternatively the lactone copolymer formation process can start with the formation of the base polymer which when formed is converted into the desired final lactone copolymer.

According to the first and most preferred method of practicing my invention said base polymer having at least one

group per molecule, wherein M is an alkali metal and preferably lithium, is (a) first contacted with an oxygenated compound. Said oxygen-containing compound is one that can react with at least one of said

groups per polymer molecule, and convert said groups to

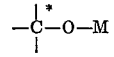

groups, e.g., converting the base polymer, i.e., polymer-lithium to polymer-oxylithium.

Suitable oxygenated compounds can be selected from oxirane compounds, aldehydes, epoxyaldehydes, polyaldehydes, ketones, epoxyketones, or lactones.

After the base polymer has been contacted with said oxygenated compound to form a polymer having at least one

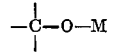

group, the resulting reaction mixture or reaction product is (b) contacted with at least one lactone monomer under conditions sufficient to cause polymerization of said at least one lactone monomer. One of the reaction product or reaction mixture following the lactone monomer contacting is then (c) contacted with the isocyanate adjuvant.

The lactone copolymer can then be recovered in any conventional manner such as by catalyst deactivation by the addition of alcohol or other known deactivating agents; separation of the polymer from solution, such as by vaporization of the diluent, thereby leaving the polymer product; and drying the polymer.

The aforedescribed sequential contacting steps (a), (b), and (c), i.e., the addition of said oxygenated compound, said lactone monomer and said isocyanate adjuvant, respectively, can be altered as to the sequence of contacting steps as hereinafter described, but the preferred sequence is as described above.

Accordingly, my process can be practiced by a second procedure comprising simultaneously performing the above described contacting steps (b) and (c) so that a mixture of said lactone monomer and said isocyanate adjuvant are contacted with one of the reaction mixture or the reaction product of step (a), i.e., the polymer having at least one

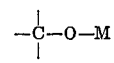

group.

Other modifications of my preferred procedure can be performed when the oxygenated compound employed is a lactone. We now have a situation wherein the oxygenated compound and said at least one lactone monomer are both lactones and can be the same compound. Thus, a third modification of my procedure comprises simultaneously performing contacting steps (a) and (b) so

*Indicating the carbon atom is not the same as that shown that the oxygenated compound contacting step (a) and lactone monomer contacting step (b) are performed as one single step.

A fourth procedure that is a modification of the lastly described method can also be performed. This fourth procedure also employs a lactone as an oxygenated compound and comprises performing simultaneously contacting steps (a), (b) and (c) so that a mixture of at least one lactone and said isocyanate adjuvant are contacted directly with said base polymer in a single process step to form a lactone copolymer. A fifth alternate process and currently the least preferred of the aforedescribed procedures comprises reversing the contacting steps (b) and (c) of the most preferred procedure, i.e., procedure 1 so that contacting step (c) is performed prior to step (b) and step (b) thus follows step (c). Accordingly, said isocyanate adjuvant is contacted with one of the reaction mixture or reaction product of the base polymer and the oxygenated compound. Subsequent to the isocyanate adjuvant contacting step the lactone monomer contacting step is lastly performed.

As hereinbefore stated substantially any base polymer which contains at least one

group per polymer molecule, wherein M is an alkali metal, preferably lithium, can be employed. Thus the final lactone copolymer can have a block structure if a terminal

group is present on the base polymer or a graft structure if an intermediate

group is present or a mixture of such structures if a mixture of terminal and intermediate groups is present.

As hereinbefore stated the base polymer can be formed in any conventional manner with any known monomer or combination of monomers so long as the resulting polymer molecules contain the required

group. The base polymer molecules can contain one or more of these groups depending upon the method by which the base polymer is formed. Monomers selected from the group consisting of conjugated dienes having from about 4 to 12 carbon atoms per molecule and monovinyl-substituted hydrocarbon aromatic compounds having from about 8 to 12 carbon atoms per molecule can be employed. Suitable conjugated dienes include 1,3-butadiene, isoprene, piperylene, 6-phenyl-1,3-hexadiene, and the like. Suitable monovinyl-substituted aromatic hydrocarbon compounds include styrene, alpha-methyl styrene, 4-methyl styrene, 4-isopropyl styrene, 2,4-dimethyl styrene, 1-vinyl naphthalene, 2-vinyl naphthalene, alkyl derivatives thereof, and the like. The base polymer can be a homopolymer of a conjugated diene or a monovinyl-substituted aromatic hydrocarbon compound or a random or block copolymer of two or more conjugated dienes or two or more monovinyl-substituted aromatic hydrocarbon compounds or a mixture of at least one conjugated diene and at least one monovinyl-substituted aromatic hydrocarbon compound.

These monomers can be polymerized using organoalkali metal compounds as initiators. A preferred initiator is that which corresponds to the formula $R^V Li_x$, wherein $R^V$ is a hydrocarbon radical selected from the group consisting of aliphatic, cycloaliphatic, and aromatic radicals and combinations thereof, and $x$ is an integer from 1 to 4, inclusive. The $R^V$ in the formula has a valence equal to the integer $x$, and preferably contains from about 1 to 20 carbon atoms, although it is within the scope of this invention to use higher molecular weight compounds. It is preferred that the initiators be alkyllithium compounds. If n-alkyllithium compounds are employed it is desirable that a small amount of a polar compound such as tetrahydrofuran be employed in order to accelerate the rate of initiation. When forming the base polymer in situ using an organoalkali metal initiator, the amount of initiator employed is generally in the range of from about 0.5 to about 20, preferably from about 1 to about 6, gram millimoles of initiator per 100 grams of monomers to be polymerized to form the base polymer. Examples of suitable polymerization initiators include methyllithium,
isopropyllithium,
n-butyllithium,
tert-octyllithium,
n-decyllithium,
phenyllithium,
1-naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5-tetralithio-4-hexylanthracene, dilithio adducts of 2,3-dialkyl-1,3-butadiene, preferably the dilithium adducts of 2,3-dimethyl-1,3-butadiene and dilithium adducts of butadiene and isoprene containing from 1 to 10 diene units per molecule, and the like. The polymerization procedures for the above monomers and initiators are well known and therefore will not be described here in detail but suitable procedures can be found in British Pats. 817,693, and 888,624, and U.S. Pat. 2,975,160; their disclosures are hereby incorporated herein by reference.

Preformed polymers of various monomers including the conjugated dienes and monovinyl-substituted aromatic compounds disclosed hereinabove can be converted to a polymer containing the requisite

groups by other procedures known in the art. For example, a hydrocarbon polymer (e.g., polybutadiene) containing either allylic or benzylic hydrogen atoms can be metallated with an alkyllithium compound (e.g., n-butyllithium) by reacting the polymer with the alkyllithium at a temperature in the range of 25–200° C. for from 2 minutes to 50 hours thereby providing base polymer having one or more intermediate

groups per polymer molecule.

A suitable method for metallating a hydrocarbon polymer is disclosed in U.S. patent application Ser. No. 458,-

487 now Pat. No. 3,492,369, filed May 24, 1965, by Naylor. Said application is herein incorporated by reference thereto.

As hereinabove stated, the oxygenated compounds employed according to this invention are selected from the following compounds: oxirane compounds, aldehydes, epoxyaldehydes, polyaldehydes, ketones, epoxyketones, and lactones.

Suitable oxirane compounds include compounds of the formula

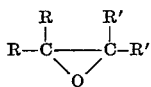

wherein each R and each R' is selected from the group consisting of hydrogen, halogen (preferably chlorine, bromine, and iodine), alkyl, aryl, alkaryl, aralkyl and cycloalkyl radicals and one R and one R' can together form an alkylene radical. Other suitable compounds are represented by the formula

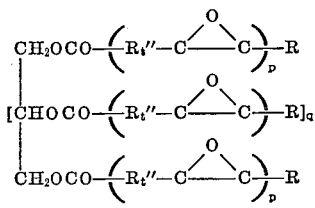

where R'' is an alkylene radical having from 1 to 10 carbon atoms, inclusive, $t$ is an integer 0 or 1 and when $t$ is 1 R'' is an alkylene radical, $p$ is an integer from 1 to 5, $q$ is an integer from 0 to 5, and the compound contains no more than 60 carbon atoms per molecule. The oxirane compounds employed have from 2 to 60 carbon atoms per molecule.

Suitable oxirane compounds include epichlorohydrin,
ethylene oxide,
propylene oxide (1,2-epoxypropane),
butylene oxide (1,2-epoxybutane and 2,3-epoxybutane),
1,2-epoxypentane,
1,2-epoxy-3-methylbutane,
2,3-epoxy-3-methylbutane,
1,2-epoxy-2,4,4-trimethylpentane,
1,2-epoxycyclohexane,
1,2-epoxycyclooctane,
1,2-epoxy-4-cyclohexylpentane,
1,2-epoxyoctadecane,
1,2-epoxyeicosane,
styrene oxide,
1,2-epoxytriacontane,
1,2-epoxy-2-cyclohexylbutane,
3,4-epoxy-3,4-diethylhexane,
3,4-epoxy-3-ethyl-4-phenylhexane,
1,2-epoxy-2-(p-tolyl)butane,
2,3-epoxy-3-methyl-2-benzylpentane,
1-bromo-2,3-epoxypropane,
1,5-dichloro-2,3-epoxypentane,
2-iodo-3,4-epoxybutane,
2,3:5,6-diepoxyhexahydro-4,7-methanoindane,
1,2:8,9-diepoxy-p-methane,
1,2:4,5:7,8-triepoxyoctane,
1,2:4,5:7,8:10,11:13,14:16,17-hexaepoxyeicosane,
glycerol,
1-(9,10:12,13:15,16-triepoxyoctadecanoate)-3-(9,10-epoxyoctadecanoate),
glycerol,
tris(9,10:12,13:15,16-triepoxyoctadeconate),
glycerol,
tris(9,10-epoxyoctadecanoate), and the like.

The aldehydes that can be employed are represented by the formula

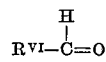

wherein $R^{VI}$ is selected from the group consisting of hydrogen, alkyl, cycloalkyl and aryl hydrocarbon radicals, and combinations thereof such as alkaryl, aralkyl, and the like, the radicals and combinations thereof containing from 1 to 20, inclusive, carbon atoms, $R^{VI}$ is preferably hydrogen or an aliphatic radical containing from 1 to 10, inclusive, carbon atoms.

Suitable aldehydes include benzaldehyde, acetaldehyde, decanal, eicosanal, 2-phenylbutanal, propanal, cyclohexanecarboxaldehyde, pentanal, 3-phenylcyclohexanecarboxaldehyde, 3-methylbenzaldehyde, 4-cyclohexylbenzaldehyde, formaldehyde and the like.

Epoxyaldehydes that can be employed in this invention are cyclic or acyclic compounds which have 3 to 20, inclusive, carbon atoms per molecule, have 1 to 6, inclusive, oxirane groups, i.e.,

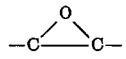

per molecule, and have 1 to 6, inclusive, formyl groups, i.e.,

per molecule.

Examples of suitable epoxyaldehydes include glycidaldehyde(2,3-epoxypropanal),
2,3-epoxycyclohexanecarboxaldehyde,
2,3-epoxybutanal,
2,3-epoxyeicosanal,
2,3-epoxy-1,4,5,7,9,11-tridecanehexanecarboxaldehyde,
2-benzyl-8-phenyl-3,4;6,7-diepoxy-1,2,8-nonanetricarboxaldehyde,
4,5;6,7-diepoxy-1,2-cyclooctanedicarboxaldehyde,
3-phenyl-2,3-epoxypropanal,
4,4-dicyclohexyl-2,3-epoxybutanal,
5-phenyl-3,4-epoxycyclohexanecarboxaldehyde, and the like.

The polyaldehydes employed can be polymers of the aldehydes set forth hereinabove having the formula

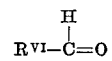

which polymers are cyclic or linear and which polymers contain from 2 to 10, inclusive, aldehyde molecules per polymer molecule.

Examples of suitable polyaldehydes include dimers, trimers, tetramers, and higher polymers of the aldehydes such as 1,3,5-trioxane, 2,4,6-triethyl-1,3,5-trioxane, and 2,4,6-trimethyl-1,3,5-trioxane.

Ketones which can be employed in this invention can be represented by the formula

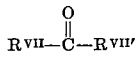

wherein $R^{VII}$ and $R^{VII'}$ are selected from the group consisting of alkyl, cycloalkyl, and aryl hydrocarbon radicals, and combinations thereof such as alkaryl and aralkyl and the like, the total number of carbon atoms in each $R^{VII}$ and $R^{VII'}$ group being from 1 to 20, inclusive, carbon atoms, and the total number of carbon atoms in the ketone being 3 to 21, inclusive, carbon atoms, and one $R^{VII}$ and one $R^{VII'}$ can together form an alkylene radical.

Examples of suitable ketones are acetone, 11-heneicosanone, acetophenone, benzophenone, acetylcyclohexane, cyclopentyl ketone, 1 - cyclooctyl-2-methyl-1-butanone, 1-phenyl-5-cyclohexyl-3-pentanone, 2- butanone, 3-decanone, 2,4-dimethyl-3-heptanone, cyclohexanone, cyclododecanone, 3-phenylcyclooctanone, cyclopentanone and the like.

Epoxyketones that can be employed in this invention are cyclic or acyclic compounds which have 4 to 20, inclusive, carbon atoms per molecule, have 1 to 6, inclusive, carbonyl groups per molecule, and have 1 to 6, inclusive, oxirane groups per molecule.

Suitable examples of epoxyketones include 2,3-epoxy-5-hexanone, 2,3;4,5-diepoxycyclooctanone, 2,3-epoxy-4,6,8,10,12,14-eicosanehexanone, 3,4;6,7;9,10;12,13;15,16;18,19-hexaepoxy-2-eicosanone, 2-phenyl - 4,5 - epoxy-3-decanone, 2-cyclopentyl-4,5-epoxy-6-phenyl-3-heptanone, 3,4-epoxy-2-butanone, 1,2-epoxy-3,6-octandione and the like.

Suitable examples of lactones which can be employed as oxygenated compounds include at least one lactone of the formula

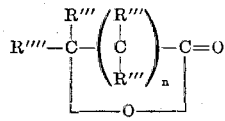

wherein $R''''$ is one of hydrogen and a radical of the formula

and when $R''''$ is a radical as specified no $R'''$ is attached to the carbon atom to which the radical is attached, wherein $R'''$ is one of hydrogen, alkyl, cycloalkyl, alkenyl, cycloalkenyl and aryl and combinations thereof such as alkylaryl, wherein the total carbon atoms in the $R'''$ and $R''''$ substituents being in the range of 1 to 12, and wherein $n$ being an integer which can be 1, 3, or 4.

Suitable lactones include beta-propiolactone, delta-valerolactone, epsilon-caprolactone, and lactones corresponding to the following acids:

2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-(2-methylphenyl)-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
2-(2-phenylethyl)-4-(4-cyclohexylbenzyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic acid,
4-(3-phenylpropyl)-6-hydroxycaproic acid,
2-benzyl-5-isobutyl-6-hydroxycaproic acid,
7-phenyl-6-hydroxy-6-octenoic acid,
2,2-di(1-cyclohexenyl)-5-hydroxy-5-heptenoic acid,
2,2-di-1-propenyl-5-hydroxy-5-heptenoic acid,
2,2-dimethyl-4-(1-propenyl)-3-hydroxy-3,5-heptadienoic acid, and the like.

The preferred oxygenated compounds employed according to this invention are the lactones and in particular epsilon-caprolactone is most preferred.

The lactones, aldehydes, epoxyaldehydes, polyaldehydes, ketones, epoxyketones set forth hereinabove are known in the art as to their existence and as to procedures for preparing same. They are commercially available.

The lactones above described as oxygenated compounds also embody those lactone compounds which are the lactone monomers that are employed according to this invention in the preparation of the final lactone copolymers of this invention and they are therefore not reiterated here.

As hereinbefore stated the isocyanate adjuvants employed according to this invention are the polyisocyanates or polyisothiocyanates. By polyisocyanate and polyisothiocyanate I am referring to compounds containing two or more NCO groups and NCS groups respectively. Polyisocyanates or polyisothiocyanates which are employed according to this invention can be represented by the general formulas $R^I(NCO)_z$ and $R^{II}(NCS)_y$ wherein $R^I$ and $R^{II}$ are aliphatic, cycloaliphatic, or aromatic radicals containing from about 2 to 30 carbon atoms and $z$ and $y$ are integers from 2 to 6. It is preferred that $R^I$ and $R^{II}$ radicals be hydrocarbon in character although the presence of unreactive groups containing other than carbon and hydrogen is permissible. Examples of suitable polyisocyanates include tolylene-2,4-diisocyanate; 2,2'-diisocyanate diethyl ether; benzene-1,2,4-triisocyanate; naphthalene-1,3,5,7 - tetraisocyanate; anthracene - 1,4,5,8,9,10-hexaisocyanate and the corresponding polyisothiocyanates such as benzene-1,2,4-triisothiocyanate and tolylene-2,4-diisothiocyanate. A commercially available polyisocyanate, such as PAPI (polymethylene poly-phenylisocyanate) having an average of about three isocyanate groups per molecule and an average molecular weight of about 380, can also be used.

The final product, i.e. lactone copolymers of this invention can vary widely as to their composition. For example the lactone copolymers can contain from about 1 to about 99 weight percent of one or more lactones based upon the total weight of the monomers used to make the base polymer and the lactone or lactones employed to make up the lactone polymer portion. Accordingly, the monomer or monomers used to make up the base polymer can be present in the final copolymer in the amount of from about 99 to about 1 weight percent based upon the total weight of those monomers and the lactone or lactones used to make up the lactone polymer portion. The base polymer can be a rubbery homopolymer of a conjugated diene, a homopolymer of a monovinyl-substituted aromatic compound, or a rubbery or resinous copolymer of a conjugated diene and a monovinyl-substituted aromatic compound which copolymer can contain any proportion of the monovinyl-substituted aromatic compound.

From the above it can be seen that the base polymer can comprise from about 1 to about 99 weight percent of the final block copolymer based upon the total weight of the final product copolymer, the remainder being substantially the lactone polymer portion. Thus, the final copolymer can contain from about 1 to about 99 weight percent lactone polymer block based on the total weight of the final copolymer.

It should be noted that copolymers of two or more polymer blocks can be prepared by this invention. For example, a block terpolymer can be prepared comprising at least one polystyrene block, at least one polybutadiene block, and at least one polylactone block. Copolymers or homopolymers can be employed as blocks in the block copolymers of this invention.

According to the process of this invention the molar ratio of the oxygenated compound employed to gram atom of alkali metal in the initiator, if the base polymer is formed in situ or alkali metal in the base polymer if preformed, should be at least 0.1/1, preferably at least 1/1. Substantially any excess oxygenated compound can be used even up to 500 moles or more per gram atom of alkali metal in the initiator or base polymer. However, an upper preferred maximum is 10, more preferably 5 moles of oxygenated compound per gram atom of alkali metal. The presently preferred range of mole ratios of oxygenated compound to gram atoms alkali metal employed in the initiator or base polymer is from 0.5/1 to about 10/1. A more preferred range of mole ratio of oxygenated compound to gram atoms alkali metal employed in the initiator or base polymer is from about 0.5/1 to about 5/1.

The oxygenated compound can be reacted with the base polymer under widely varying reaction conditions. Temperatures and pressure sufficient to maintain the reaction substantially in the liquid phase are presently preferred. Preferred reaction temperatures are from about $-20°$ to about $300°$, preferably from about $30°$ to about $250°$ F. The reaction times can be from about 1 second to about 2 hours. Longer times can of course be employed.

The amount of isocyanate adjuvant employed according to this invention can be in the range of from about 0.25 to 10 preferably 0.50 to 3.5 gram milliequivalents of isocyanate or isothiocyanate per gram milliequivalent of alkali metal added in the polymerization initiator or present in the preformed base polymer. The isocyanate adjuvant contacting step is carried out at a temperature in the range of about $-20$ to $300°$, preferably 30 to $250°$ F. The time employed in this step is generally within the range of about 0.5 minute to 10 hours, preferably from about 5 minutes to 1 hour.

The polymerization of the monomers to form the base polymer as well as the contacting step with at least one lactone monomer can be carried out at substantially any polymerization temperature and is generally in the range of from about $-20°$ to about $300°$, preferably from about $30°$ to $250°$ F. Polymerization pressures can also vary widely but will generally be that which is sufficient to maintain the reaction mixture substantially in the liquid phase. Pressure can be autogenous or elevated to the extent in which the apparatus employed can be operated. Polymerization time for both the base polymer preparation and the lactone monomer contacting step is temperature dependent. Sufficient time can be allowed in the formation of the base polymer and for the added at least one lactone monomer for substantially complete conversion of monomers. Time is generally in the range of from about 0.5 minute to about 100 hours or more. When, according to the third procedure of this invention, said oxygenated compound is a lactone and wherein said contacting of said oxygenated compound step and said contacting step of said at least one lactone monomer are simultaneously performed, it is preferred that the contacting time prior to the addition of said isocyanate adjuvant is from about 0.5 minute to 2 hours more preferably less than 30 minutes.

The temperatures, times, and pressures, and other operating conditions can be the same or different in making the base polymer and in the contacting of at least one lactone monomer. Polymerization time for making the base polymer and the contacting of said at least one lactone monomer can each be varied as desired to obtain the desired result of quantitative conversion of the monomers or any amount of conversion less than quantitative.

The formation of the base polymer and all of applicant's contacting steps can be carried out in the presence or absence of diluent but it is preferred to employ a diluent such as hydrocarbon diluents selected from the group consisting of paraffins, cycloparaffins, aromatic hydrocarbons containing from about 4 to 10 carbon atoms per molecule, and mixtures thereof. Other diluents that can be employed are those which are inert to the reactive products thereof under the conditions of the reaction and polymerization, for example, ethers having from 2 to 6 carbon atoms per molecule inclusive such as methyl ether, ethyl ether, dioxane, tetrahydrofuran, and the like. These other types of diluents can be employed alone or in admixture with one another or in admixture with hydrocarbon diluents, and the like.

The block copolymers prepared according to this invention can be compounded in any conventional manner with conventional additives such as carbon black, pigments, antioxidants, and other known stabilizers.

The final copolymers of this invention when compounded and cured, can be made to vary from elastomeric to plastic (resinous), depending upon conjugated diene content thereof. The final copolymers of this invention can be compounded with various conventional additives such as carbon black and other fillers, antioxidants, ultraviolet light stabilizers, foaming agents, plasticizers, extender oils, vulcanizing agents, vulcanization accelerators, and the like in a conventional manner. Depending upon whether conjugated dienes are employed in making the final copolymers of this invention, those copolymers can be made to contain residual unsaturation for subsequent curing and the like. Unsaturated final copolymers of this invention can be hydrogenated to reduce the amount of residual unsaturation and thereby increase the resistance of the block copolymers to attack by oxygen, ozone, and other oxidizing agents.

The lactone copolymers produced by the processes of this invention can be employed as leather substitutes. They are also suitable for applications in both rubber and plastic fields. The polymers of this invention can be formed into specific products such as floor mats, rubber hose, bottles, food trays, bowls, and the like.

Illustrative of the foregoing discussion and not to be interpreted as a limitation on the scope thereof or upon the materials therein employed the following examples are provided.

EXAMPLE I

Runs were conducted for the preparation of a styrene/butadiene/ε-caprolactone (25/50/25) block copolymer. The recipe employed in these runs is shown below:

Styrene polymerization—Step 1:
    Cyclohexane, parts, by weight _____ 780
    Tetrahydrofuran (THF), parts, by weight ____ 0.05
    Styrene, parts, by weight _____ 25
    n-Butyllithium (mhm.) [1] _____ 1.8
    Temperature, ° F. _____ 158
    Time, hours _____ 0.5
Butadiene polymerization—Step 2:
    1,3-butadiene, parts, by weight _____ 50
    Temperature, ° F. _____ 158
    Time, hours _____ 0.5
Treatment with oxygenated compound—Step 3:
    ε-Caprolactone, mhm. _____ 1.1
    Temperature, ° F. _____ 158
    Time, minutes _____ 5

[1] Gram millimoles per 100 grams of monomers, i.e., styrene butadiene and ε-caprolactone.

In these runs cyclohexane was charged to the reactor first followed by a nitrogen purge. Styrene was added next followed by the tetrahydrofuran and the n-butyllithium. The temperature was adjusted to 158° F. and the styrene polymerized for 0.5 hour after which the butadiene was added to the reaction mixture and polymerized for 0.5 hour. The oxygenated compound was then added to form the polymer-oxylithium. The charge order for the remaining ingredients and the quantities employed are indicated in Table I and the footnotes below.

Each run was charged with a 10 weight percent solution of 2,2′-methylene-bis(4-methyl-6-tert-butylphenol) in a 50/50 by volume mixture of isopropyl alcohol and toluene with the amount added being sufficient to provide about 1 part by weight of the antioxidant per 100 parts by weight of the polymer. Each of the mixtures was then coagulated in isopropyl alcohol and the polymeric products separated and dried. The results are presented in Table I.

These results demonstrate that very short lactone polymerization times and varying amounts of polyisocya-

TABLE I

| Run No. | PAPI, meq. hm.ª | Ratio, meq. NCO/Li | Lactone i conversion, percent | Copolymer properties | | |
|---|---|---|---|---|---|---|
| | | | | Mooney b viscosity | Inherent c viscosity | Green tensile,d p.s.i. |
| 1 e | 1.5 | 0.83 | 77 | 100 | 1.42 | 5,585 |
| 2 f | 1.5 | 0.83 | 87 | 104 | 1.62 | 5,066 |
| 3 f | 3.3 | 1.83 | 87 | 116 | 1.74 | 5,320 |
| 4 g | 1.8 | 1.00 | 93 | 111 | 1.62 | 4,936 |
| 5 h | 0 | | 60 | 34 | 0.85 | 1,410 |

ª Gram milliequivalents per 100 grams of total monomer, i.e., styrene, butadiene, lactone.
b ASTM D 1646-63 (MS-4 at 270° F.).
c Determined according to the procedure of U.S. Pat. 3,278,508, column 20, notes a and b. Each polymer was gel-free.
d Samples molded at 250° F. for 3 minutes. Values are averages of 3 runs obtained with the Instron (Model TM) at a 1 inch gauge and 20 inches/min. crosshead speed.
e The reaction mixture was charged with a mixture of the lactone monomer and the PAPI.
f The reaction mixture from step 3 was charged with the lactone monomer and allowed to react for 1 minute prior to addition of the PAPI.
g The reaction mixture from step 3 was charged with the PAPI and allowed to react for 1 minute prior to addition of the lactone monomer.
h The reaction mixture from step 3 was charged directly with the lactone monomer.
i The lactone monomer employed was ε-caprolactone, 25 parts by weight per 100 parts by weight total monomer, i.e., styrene, butadiene, lactone monomer. The lactone monomer contacting step was conducted at 158° F. for 10 minutes.

Example I effectively demonstrates various procedures employable according to this invention in the production of lactone copolymers possessing excellent green tensile strength.

EXAMPLE II

Other runs were conducted according to the charging procedure of Run 2 of Example I with the exception that variable amounts of PAPI were employed and variable times for the lactone monomer contacting step were employed. The same polymerization recipe and conditions as employed in Example I were employed except that 20 parts by weight of styrene, 20 parts by weight of butadiene and 60 parts by weight of ε-caprolactone monomer were used. The lactone monomer was added to the reaction mixture from Step 3 as in Example I and the PAPI was added to the reaction mixture after the time shown in Table II for lactone monomer polymerization. The isonates can be employed according to this invention and that high lactone conversion and excellent green tensile strength are achieved in the polymers so produced.

EXAMPLE III

Runs (Nos. 1-3) were carried out using the polymerization recipe of Example II while other runs (Nos. 4 and 5) used the polymerization recipe of Example I, employing a 1 minute lactone polymerization time, variable levels of PAPI and a 10 minute reaction period after the addition of the PAPI. Again, as in Examples I and II, the polymerization mixture following the butadiene polymerization was reacted with 1.1 mhn. ε-caprolactone as the oxygenated compound prior to the addition of the lactone monomer. The polymer recovery procedures were the same as employed in Example I. The results of these runs are given in Table III.

TABLE III

| Run No. | PAPI, meq. hm. | Ratio, meq. NCO/Li | Lactone conversion, percent | Inherent a viscosity | Mooney viscosity b | Green tensile, p.s.i. |
|---|---|---|---|---|---|---|
| 1 | 1.5 | 0.83 | 95 | 1.69 | 89 | 6,585 |
| 2 | 2.1 | 1.17 | 97 | 2.28 | 124 | 6,066 |
| 3 | 2.7 | 1.50 | 95 | 2.68 | 135 | 4,650 |
| 4 | 3.0 | 1.67 | 95 | 1.74 | 112 | 5,126 |
| 5 | 4.5 | 2.50 | 95 | 1.54 | 114 | 4,570 | a All polymers were gel-free.
b MS-4 at 270° F.

cyanate adjuvant was allowed to react for an additional 20 minutes at 158° F. and the polymers recovered according to the procedures of Example I. The results are represented in Table II.

These results again demonstrate that high lactone conversion and excellent green tensile strength can be obtained in the lactone-containing block polymers according to this invention.

TABLE II

| Run No. | LactonePzn. time, min. | PAPI, meq. hm. | Ratio, meq. NCO/Li | Lactone conversion, percent | Inherent a viscosity | Mooney b viscosity | Green tensile, p.s.i. |
|---|---|---|---|---|---|---|---|
| 1 | 3 | 1.2 | 0.67 | 92 | 1.77 | 91 | 5,503 |
| 2 | 1 | 1.5 | 0.83 | 94 | 1.89 | 106 | 4,576 |
| 3 | 3 | 1.5 | 0.83 | 94 | 1.82 | 104 | 5,323 |
| 4 | 5 | 1.5 | 0.83 | 93 | 1.85 | 101 | 4,705 |
| 5 | 3 | 1.8 | 1.00 | 95 | 1.93 | 116 | 4,273 |
| 6 | 3 | 2.1 | 1.17 | 96 | 1.97 | 104 | 5,836 |
| 7 | 1 | 2.4 | 1.33 | 94 | 1.97 | 102 | 5,596 |
| 8 | 3 | 2.4 | 1.33 | 95 | 2.18 | 114 | 4,800 |
| 9 | 5 | 2.4 | 1.33 | 93 | 2.52 | 127 | 5,660 |
| 10 | 3 | 2.7 | 1.50 | 93 | 1.94 | 115 | 6,303 | a Each of the polymers was gel-free.
b MS-4 at 270° F.

EXAMPLE IV

Other runs were conducted to demonstrate alternative procedures employable according to the invention. In some of these runs the oxygenated compound contacting step, when a lactone, was thus employed, and the lactone monomer contacting step were simultaneously performed. The recipe employed in these runs is as follows:

POLYMERIZATION RECIPE

| | |
|---|---|
| Cyclohexane, parts, by weight | 780 |
| Styrene (Sty), parts by weight | 25 |
| Butadiene (Bd), parts, by weight | 50 |
| ε-Caprolactone (CL), parts, by weight | 25 |
| Tetrahydrofuran (THF), parts, by weight | 0.05 |
| n-Butyllithium (BuLi), mhm | 1.7 |
| Tolylene-2,4-diisocyanate (TDI) | Variable |
| Ethylene oxide (EO) | Variable |
| Temperature, °F. | 158 |
| Time, hours: | |
|   Styrene polymerization | 0.5 |
|   Butadiene polymerization | 0.5 |
|   ε-Caprolactone polymerization | 6.0 |

In these runs cyclohexane was charged to the reactor first followed by a nitrogen purge. Styrene was added next followed by the tetrahydrofuran and then n-butyllithium. The temperature was adjusted to 158° F. and the styrene polymerized for 0.5 hour after which the butadiene was added and polymerized for 0.5 hour. In Runs 1 and 2 all of the ε-caprolactone was then added. Following the 6.0 hours contacting time of the ε-caprolactone the isocyanate adjuvant was added to Run 1. In Run 3 ethylene oxide was employed as the oxygenated compound and was added following the butadiene polymerization and allowed to react for about 5 minutes prior to the addition of the lactone monomer. The results are presented in Table IV.

TABLE IV

| Run No. | EO, mhm. | TDI, mhm. | Ratio, meq. NCO/Li | Lactone conversion, percent | Green tensile, p.s.i. |
|---|---|---|---|---|---|
| 1 | | 1.7 | 0.50 | 68 | 4,800 |
| 2 | | | | 8 | 3,600 |
| 3 | 5.1 | | | 20 | (a) |
| 4 [b] | 5.1 | 1.7 | 0.50 | 52 | 4,100 | a Too low to measure.
b The latter stage charge order was reversed from that of Run 1 so that the isocyanate adjuvant was added prior to the lactone, i.e., EO–TDI–CL.

The above example demonstrates the production of block copolymers, in good conversion, of lactones having good green tensile strength when prepared according to my invention.

EXAMPLE V

Another series of runs were conducted according to this invention employing the lactone of 2,2,4-trimethyl-3-hydroxy-3-pentenoic acid (TMBL) as the lactone monomer and a commercial polyisocyanate (PAPI) as the isocyanate adjuvant. The recipe employed is shown below and the results are presented in Table V.

POLYMERIZATION RECIPE

| | |
|---|---|
| Cyclohexane, parts, by weight | 780 |
| Styrene, parts, by weight | 25 |
| Tetrahydrofuran, parts, by weight | 0.05 |
| Butadiene, parts, by weight | Variable |
| TMBL, parts, by weight | Variable |
| Ethylene oxide, parts, by weight | Variable |
| n-Butyllithium, mhm. | 1.8 |
| PAPI, parts by weight | Variable |
| Temperature, °F. | 158 |
| Time, hours: | |
|   Styrene polymerization | 0.5 |
|   Butadiene polymerization | 0.5 |
|   TMBL polymerization | 17 |

In these runs, the styrene and butadiene were charged and polymerized as in Example IV. At the end of the butadiene polymerization, ethylene oxide (oxygenated compound) was added followed by the lactone (TMBL) (after about 5 minutes reaction), and then the PAPI dissolved in the remainder of the TMBL added immediately thereafter.

TABLE V

| Run No. | Bd, phm.[a] | TMBL, phm. | EO, phm. | PAPI, meq. hm. | Ratio, meq. NCO/Li | Lactone conversion, percent | Green tensile, p.s.i. |
|---|---|---|---|---|---|---|---|
| 1 | 50 | 25 | 5.4 | 1.0 | 0.55 | 70 | 5,100 |
| 2 | 50 | 25 | 5.4 | 1.2 | 0.67 | 70 | 4,000 |
| 3 | 50 | 25 | 0 | 1.2 | 0.67 | 60 | 1,800 |
| 4 | 60 | 15 | 5.4 | 1.2 | 0.67 | 84 | 4,500 |
| 5 | 60 | 15 | 5.4 | 1.4 | 0.78 | 84 | 3,800 |
| 6 | 60 | 15 | 5.4 | 1.5 | 0.83 | 92 | 4,000 |
| 7 | 60 | 15 | 0 | 1.4 | 0.78 | 64 | 1,600 |
| 8 | 35 | 40 | 5.4 | 1.0 | 0.55 | 80 | 2,900 |
| 9 | 35 | 40 | 5.4 | 1.2 | 0.67 | 60 | 2,900 |
| 10 | 35 | 40 | 5.4 | 1.3 | 0.72 | 81 | 3,200 | a Parts by weight per 100 parts of total monomers, i.e., styrene, Bd, and TMBL.

The results demonstrate that according to the process of this invention good conversion of lactone is obtained and good tensile strength is shown by the polymers.

As will be evident to those skilled in the art, various modifications of this invention can be made or followed, in light of the disclosure and discussion herein set forth without departing from the scope or the spirit thereof.

I claim:

1. A process for preparing lactone copolymers comprising (a) contacting a base polymer having at least one

group per molecule, wherein M is an alkali metal atom, with an oxygenated compound selected from oxirane compounds, aldehydes, epoxyaldehydes, polyaldehydes, ketones, epoxyketones, or lactones; wherein said oxygenated compound is employed in an amount to provide at least about 0.1 mole of said oxygenated compound per gram atom of alkali metal in said base polymer; wherein said oxirane compound contains from about 1 to 10 oxirane groups and from 2 to 60 carbon atoms per molecule; wherein said aldehyde can be represented by the formula:

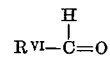

wherein $R^{VI}$ is selected from the group consisting of hydrogen, alkyl, cycloalkyl and aryl hydrocarbon radicals, and combinations thereof, containing from 1 to 20 carbon atoms; wherein said epoxyaldehyde is one of cyclic and acyclic, and contains from 3 to 20 carbon atoms per molecule, 1 to 6 oxirane groups per molecule, and 1 to 6 formal groups per molecule; wherein said polyaldehyde is one of cyclic and linear aldehydes formed from the above aldehydes, said polyaldehydes containing from 2 to 10 aldehyde molecules per polymer molecule; wherein said ketone can be represented by the formula

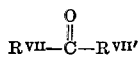

wherein $R^{VII}$ and $R^{VII'}$ are selected from the group consisting of alkyl, cycloalkyl, and aryl hydrocarbon radicals, and combinations thereof, each $R^{VII}$ and $R^{VII'}$ containing from 1 to 20 carbon atoms, the total number of carbon atoms in the ketone being 3 to 21 and $R^{VII}$ and $R^{VII'}$ taken together can be an alkylene radical; wherein said epoxyketones are one of cyclic and acyclic having 4 to 20 carbon atoms per molecule and have 1 to 6 carbonyl groups per molecule and have 1 to 6 oxirane groups per molecule; and wherein said lactone can be represented by the following formula:

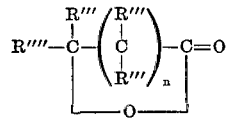

wherein $R''''$ is one of hydrogen and a radical of the formula

and when $R''''$ is a radical as specified no $R'''$ it attached to the carbon atom to which the radical is attached, wherein $R'''$ is selected from the group consisting of hydrogen, alkyl, cycloalkyl, alkenyl, cycloalkenyl, aryl, and combinations thereof, the total carbon atoms in the $R'''$ and $R''''$ substituents being in the range of 1 to 12, and $n$ being an integer of 1, 3 or 4; wherein said contacting is carried out under conditions sufficient to convert said base polymer to a polymer oxyalkalimetal compound;

(b) contacting one of the reaction mixture or reaction product of step (a) with at least one lactone monomer said lactone monomer is as represented above for the lactone oxygenated compound, wherein said contacting step (b) is carried out in the presence of amounts of lactone monomers and under conditions sufficient to cause polymerization of said at least one lactone monomer; and (c) contacting one of the reaction mixture or reaction product of step (b) with an isocyanate adjuvent selected from polyisocyanate or polyisothiocyanate; wherein said isocyanate adjuvant is employed in an amount to provide from about 0.25 to 10 gram milliequivalents of isocyanate or isothiocyanate per gram milliequivalent of said alkali metal present in said base polymer; wherein said polyisocyanate and said polyisothiocyanate can be represented by the following general formulas, respectively $$R^I(NCO)_z \text{ and } R^{II}(NCS)_y$$

wherein $R^I$ and $R^{II}$ are aliphatic, cycloaliphatic, or aromatic radicals containing from about 2 to 30 carbon atoms and $z$ and $y$ are integers from 2 to 6.

2. The process of claim 1 wherein said contacting steps (b) and (c) are simultaneously performed so that a mixture of said lactone monomer and said isocyanate adjuvant are contacted with one of the reaction mixture or reaction product of step (a).

3. The process of claim 1 wherein said oxygenated compound is a lactone and wherein said contacting steps (a), (b), and (c) are simultaneously performed so that a mixture of lactone and said isocyanate adjuvant is contacted with said polymer having at least one

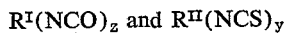

group per molecule.

4. The process of claim 1 wherein said oxygenated compound is a lactone and wherein said contacting steps (a) and (b) are simultaneously performed and wherein the contacting time of steps (a) and (b) before said contacting step (c) is from about 0.5 minute to 1 hour.

5. A process for preparing lactone copolymers comprising (a) contacting a base polymer having at least one

group per molecule, wherein M is an alkali metal atom, with an oxygenated compound selected from the group consisting of oxirane compounds, aldehydes, eporyaldehydes, polyaldehydes, ketones, epoxy ketones, and lactones wherein said oxygenated compound is employed in an amount to provide at least about 0.1 mole of said oxygenated compound per gram atom of alkali metal in said base polymer wherein said oxirane compound contains from about 1 to 10 oxirane groups and from 2 to 60 carbon atoms per molecule; wherein said aldehyde can be represented by the formula:

wherein $R^{VI}$ is selected from the group consisting of hydrogen, alkyl, cycloalkyl and aryl hydrocarbon radicals, and combinations thereof, containing from 1 to 20 carbon atoms; wherein said epoxyaldehyde is one of cyclic and acyclic, and contains from 3 to 20 carbon atoms per molecule, 1 to 6 oxirane groups per molecule, and 1 to 6 formal groups per molecule; wherein said polyaldehydes is one of cyclic and linear aldehydes formed from the above aldehydes, said polyaldehydes containing from 2 to 10 aldehyde molecules per polymer molecule; wherein said ketone can be represented by the formula

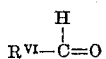

wherein $R^{VII}$ and $R^{VII'}$ are selected from the group consisting of alkyl, cycloalkyl, and aryl hydrocarbon radicals, and combinations thereof, each $R^{VII}$ and $R^{VII'}$ containing from 1 to 20 carbon atoms, the total number of carbon atoms in the ketone being 3 to 21 and $R^{VII}$ and $R^{VII'}$ taken together can be an alkylene radical; wherein said epoxyketones are one of cyclic and acyclic having 4 to 20 carbon atoms per molecule and have 1 to 6 carbonyl groups per molecule and have 1 to 6 oxirane groups per molecule; and wherein said lactone can be represented by the following formula:

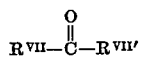

wherein $R''''$ is one of hydrogen and a radical of the formula

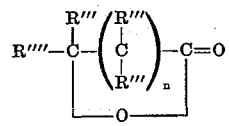

and when $R''''$ is a radical as specified no $R'''$ it attached to the carbon atom to which the radical is attached, wherein $R'''$ is selected from the group consisting of hydrogen, alkyl, cycloalkyl, alkenyl, cycloalkenyl, aryl, and combinations thereof, the total carbon atoms in the $R'''$ and $R''''$ substituents being in the range of 1 to 12, and $n$ being an integer of 1, 3 or 4, wherein said contacting is carried out under conditions sufficient to convert said base polymer to a polymer oxyalkalimetal compound;

(b) contacting one of the reaction mixture or reaction product of step (a) with an isocyanate adjuvant selected from polyisocyanate or polyisothiocyanate wherein said isocyanate adjuvant is employed in an amount to provide from about 0.25 to 10 gram milliequivalents of isocyanate or isothiocyanate per gram milliequivalent of said alkali metal present in said base polymer, wherein said polyisocyanate and said polyisothiocyanate can be represented by the following general formulas, respectively, $$R^I(NCO)_z \text{ and } R^{II}(NCS)_y$$

wherein $R^I$ and $R^{II}$ are aliphatic, cycloaliphatic, or aromatic radicals containing from about 2 to 30 carbon atoms and $z$ and $y$ are integers from 2 to 6; and (c) contacting one of the reaction mixture or reaction product of step (b) with at least one lactone monomer, said lactone monomer is as represented above for the lactone oxygenated compound, wherein said contacting step (c) is carried out in the presence of amounts of lactone monomers and under conditions sufficient to cause polymerization of said at least one lactone monomer.

6. The process of claim 1 wherein said alkali metal atom is lithium, wherein the temperature employed in contacting steps (a) through (c) is from about −30 to 300° F., and wherein said oxygenated compound is employed in an amount to provide 0.5 to 10 moles of said oxygenated compound per gram atom of said alkali metal in said base polymer.

7. The process of claim 1 wherein said contacting step (a) is conducted from about 1 second to 2 hours, wherein said contacting step (b) is conducted for about 0.5 minute to 100 hours, and wherein contacting step (c) is conducted for about 0.5 minute to about 10 hours.

8. The process of claim 6 wherein said temperature is from about 30 to 250° F., said oxygenated compound is employed in an amount to provide about 0.5 to 5 moles per gram atom of said alkali metal, and wherein said isocyanate adjuvant is employed in an amount to provide about 0.5 to 3.5 gram milliequivalents of isocyanate or isothiocyanate per gram milliequivalent of said alkali metal.

9. The process of claim 8 wherein said base polymer comprises a styrene/butadiene block copolymer, styrene homopolymer, butadiene homopolymer, or a butadiene-styrene random copolymer.

10. The process of claim 8 wherein said oxygenated compound is ε-caprolactone and said isocyanate adjuvant is polymethylene polyphenylisocyanate.

11. The process of claim 10 wherein said lactone monomer is ε-caprolactone and said base polymer is a styrene/butadiene block copolymer.

12. The process according to claim 5 wherein said alkali metal atom is lithium, wherein the temperature employed in contacting steps (a) through (c) is from about −20 to 300° F.; wherein said oxygenated compound is employed in an amount to provide 0.5 to 10 moles of said oxygenated compound per gram atom of said alkali metal in said base polymer.

13. The process of claim 5 wherein said contacting step (a) is conducted for about 1 second to 2 hours; wherein said contacting step (b) is conducted for about 0.5 minute to 100 hours, and wherein said contacting step (c) is conducted for about 0.5 minute to about 10 hours.

14. The process of claim 11 wherein said temperature is from about 30 to 250° F., said oxygenated compound is employed in an amount to provide about 0.5 to 5 moles per gram atom of said alkali metal, said isocyanate adjuvant is employed in an amount to provide about 0.5 to 3.5 gram milliequivalents of isocyanate or isothiocyanate per gram milliequivalent of said alkali metal, said base polymer is a styrene/butadiene block copolymer, styrene homopolymer, butadiene homopolymer or a butadiene-styrene random copolymer, said oxygenated compound is ε-caprolactone, said isocyanate adjuvant is PAPI and said lactone monomer is ε-caprolactone.

References Cited
UNITED STATES PATENTS

| | | | |
|---|---|---|---|
| 3,312,753 | 4/1967 | Bailey et al. | 260—823 |
| 3,498,819 | 1/1970 | Buster | 260—823 |
| 3,510,462 | 5/1970 | Hayes et al. | 260—82.1 |
| 3,441,541 | 4/1969 | D'Ancicco | 260—77.5 |

JOSEPH L. SCHOFER, Primary Examiner

R. A. GAITHER, Assistant Examiner

U.S. Cl. X.R.

260—823, 830, 874, 876, 880

19488 LHC

UNITED STATES PATENT OFFICE

CERTIFICATE OF CORRECTION

Patent No. 3,598,799  Dated: August 10, 1971

It is certified that error appears in the above-identified patent and that said Letters Patent are hereby corrected as shown below:

Col. 15, claim 1, line 30 at the end of the line "it" should be --- is ---;

claim 2, line 66, after "adjuvant" and before "contacted"
        should be --- is --- instead of "are".

Col. 16, claim 5, line 15, after "aldehydes" and before "polyaldehydes,
        the "eporyaldehydes" should be
        --- epoxyaldehydes ---;
    line 69, at the end of the line, after "R"' " should
        be --- is --- instead of "it".

Col. 17, claim 6, line 29, after "about" and before "to" the "-30"
        should be --- -20 ---.

Signed and sealed this 9th day of May 1972.

(SEAL)
Attest:

EDWARD M.FLETCHER,JR.
Attesting Officer

ROBERT GOTTSCHALK
Commissioner of Patents